United States Patent [19]
Edwards et al.

[11] Patent Number: 5,516,562
[45] Date of Patent: May 14, 1996

[54] CONTAINERS

[75] Inventors: David B. Edwards; Alan J. Aldred, both of Ongar, United Kingdom

[73] Assignee: Rhone-Poulenc Agriculture, Ltd., Ongar, United Kingdom

[21] Appl. No.: 849,006

[22] PCT Filed: Oct. 23, 1990

[86] PCT No.: PCT/GB90/01628

§ 371 Date: Sep. 22, 1993

§ 102(e) Date: Sep. 22, 1993

[87] PCT Pub. No.: WO91/05715

PCT Pub. Date: May 2, 1991

[30] Foreign Application Priority Data

Oct. 23, 1989 [GB] United Kingdom .................. 8923800

[51] Int. Cl.[6] .......................... B65D 85/84; B65D 90/04; B65D 30/08; B29D 23/00
[52] U.S. Cl. ...................... 428/34.2; 428/36.4; 428/36.5; 428/76; 428/218; 383/1; 383/113; 220/453; 220/454; 220/457; 427/233; 206/524.7
[58] Field of Search ................... 428/36.4, 36.5, 428/76, 218, 34.2; 383/113, 1; 427/233; 220/453, 454, 457; 206/524.7

[56] References Cited

U.S. PATENT DOCUMENTS

| | | | |
|---|---|---|---|
| 4,927,038 | 5/1990 | Roebuck | 220/454 |
| 4,981,730 | 1/1991 | Zaleski | 427/393.5 |
| 5,199,795 | 4/1993 | Russo et al. | 383/113 |
| 5,219,504 | 6/1993 | Insley | 264/116 |

*Primary Examiner*—Sharon Gibson
*Assistant Examiner*—Kathryne E. Shelborne
*Attorney, Agent, or Firm*—Morgan & Finnegan

[57] ABSTRACT

A container suitable for hazardous liquids such as agrochemical concentrates comprises an outer shell (I) made from a compressed fiber material, typically recycled biodegradable material, having an associated barrier (3) comprising a water soluble or water dispersible polymeric material. The container is stackable. A method of making the container, and of testing the coating for leaks, is also described.

19 Claims, 2 Drawing Sheets

CONTAINERS

The present invention relates to containers, in particular to containers suitable for storing hazardous substances such as liquid or gel concentrates, and to their production.

At present most hazardous liquids are stored in metal drums or, where smaller quantities are required, plastics containers. Such plastics containers clearly have to be made from a material which is impermeable and resistant to the liquid to be stored but also have to be made sufficiently thick to withstand mechanical shocks which frequently occur during transport, storage and use.

Once the contents have been used, however, it is necessary to dispose of the container and while traditionally such containers would be disposed of by burning or dumping, this is becoming increasingly difficult because many of the plastics used are not bio-degradable and can give off noxious fumes when burnt. For these reasons the use and manner of disposal of certain plastics such as polypropylene and PVC is being restricted in many countries.

An important aim of the present invention is to provide containers adapted to contain agrochemical products, that is to say chemical products for use in agriculture, particularly pesticides, and more particularly such products in the solid, liquid or gel state.

In fact, the storage, transport and manipulation of agrochemical products gives rise to particular problems and difficulties, firstly because agricultural workers do not always take particular care or take routine precautions in the use of such chemicals and secondly because it is particularly necessary to protect the environment. Thus, in this area, there is a very particular need for containers which are carefully adapted for their intended use. Furthermore, when the agrochemical products are fluid, in particular when they are in the liquid or gel form (and more particularly as liquids) the risk of leakage is substantially greater and it is more than ever necessary to take steps to prevent possible pollution.

According to the present invention there is provided a container comprising a moulded outer shell made from a compressed fibre material having an associated barrier comprising a water soluble or water dispersible polymeric material which is resistant to its intended contents. According to a further feature of the present invention there is provided a container comprising a moulded outer shell made from a compressed fibre material, the material comprising a water soluble or water dispersible polymeric material to render it resistant to its intended contents and/or the shell having at least its inner surface provided with a closely adherent coating comprising a water soluble or water dispersible polymeric material which is resistant to its intended contents. According to a preferred feature of the present invention there is provided a container comprising a moulded outer shell made from a compressed fibre material having its inner surface provided with a closely adherent coating comprising a water soluble or water dispersible polymeric material which is resistant to its intended contents.

The fibre outer shell is shock-absorbent to protect the contents of the container against mechanical shocks. It also acts to some extent as a temperature insulator thus preventing sudden changes in the temperature of the surroundings being transmitted quickly to the contents. This can be important because sudden temperature changes degrade some substances. The presence of the supportive and protective container outer means that the water soluble or water dispersible polymeric material need not provide support so that there is less plastic to dispose of than in the all-plastics containers formerly used.

When the compressed fibre material comprises polymeric material the polymeric material may, for example, be substantially uniformly distributed throughout the compressed fibre material or may be present in the surface layers thereof as a result of absorption into the fibre material, e.g. if the container is dipped into a solution of the polymeric material. A container comprising both a closely adherent coating of polymeric material on its inner surface and polymeric material in the will does provide enhanced security for its contents. The polymeric material in the fibre material and in the coating, when both are present, may be the same or different.

The plastics material-used preferably should be capable of being applied by dipping or spraying. It must, of course, be resistant to the container contents. Strength is not a prerequisite, however, which means that the polymer can be more "environmentally-friendly" than the plastics needed for prior containers. Where the container is for a liquid or gel, the associated barrier should, of course, be impermeable to the liquid or the gel. The container may also be gas impermeable to prevent the passage of noxious fumes from the contents or of damaging gas or vapour to the contents. The container may be hermetically sealed to isolate the contents from, e.g. changes in atmospheric humidity.

The water soluble or water dispersible polymeric material may be, for example, polyethylene oxide, methyl cellulose or polyvinyl alcohol. Polyvinyl alcohol is preferred: a hot water soluble or cold water soluble grade will generally be used. Cold water soluble grade is preferred by virtue of its greater ease of dissolution and better biodegradability. 88–92% hydrolysed polyvinyl alcohol is preferred.

The compressed fibre material may be biodegradable, preferably compostable, such as recycled cellulose fibre produced from waste paper. This further eases the problems of disposal because the bulk of the container is made from an environmentally-friendly material.

The container may further comprise a water-soluble or dispersible envelope for containing the contents, the envelope simply resting in the container so that it can be tipped out by inverting the container. To avoid puncturing the envelope the surface of the polymeric coating (or more generally the inner surface of the fibre outer shell, especially when the polymeric material is incorporated in the fibre outer shell) is preferably smooth. The provision of the envelope is particularly useful where the container is used for harmful solids or liquid concentrates which are to be added to a water-diluent, because the presence of the water soluble or dispersible envelope reduces the chances of the user accidentally coming into contact with the concentrate.

The container may be divided into several compartments by at least one wall of the compressed fibre material, the material comprising a water soluble or water dispersible polymeric material to render it resistant to its intended contents and/or the walls of each compartment being provided with the spray coating comprising a water soluble or water dispersible polymeric material applied e.g. by dipping or spraying. The compartments may be different sizes.

The container is particularly useful for storing hazardous materials and particularly liquid or gel or gelled agrochemicals such as liquid or gel-like fertilizers or biocides. The container may be used for solids, liquids or gels, particularly liquids or gels. The containers are useful for agrochemicals, especially pesticides.

The shock-absorbency of the fibre .outer shell helps to protect the contents or envelope (when present) within the container against mechanical shocks thereby reducing the risk of leakage or rupture of any envelope present particularly when the contents are liquid. When the envelope contains a substantial quantity of liquid or gel, e.g. a quarter to three liters, preferably a half liter to two liters (a half liter being especially preferred) the hydraulic shock arising in the liquid if the package is dropped is prone to cause the envelope to break or leakage. The shock absorbent outer then helps to protect the envelope. The shock absorbency also helps to reduce the risk of the outer container (or the associated barrier of polymeric material) splitting or leaking.

The space between the envelope, when present, and the outer container (which is preferably at least about 5% of the volume of the container; the space will preferably not be more than about 30%: larger spaces could be used but may be less attractive commercially: 20 to 25% is preferred and about 25% is especially preferred. The space if preferably isolated from the atmosphere for example by a hermetic seal on the outer container. The relative humidity in the space is preferably from 45 to 70% (more preferably 50 to 60%, about 50% being most preferred) at a temperature of 20° C. When the envelope material is PVA film the mechanical properties of the film are affected by its moisture content: moisture in the film is in equilibrium with moisture both in any air space inside the envelope and in any space between the envelope and the outer container. The point of equilibrium changes with temperature so that the film may either absorb moisture or release it during storage. A relative humidity of 45 to 70% at 20° C. has been found to preserve optimum storage properties of the envelope material.

The container of the invention is produced by providing the fibrous moulded shell, which itself cannot withstand liquids or hazardous materials, with a coating of a water soluble or water dispersible polymeric material or by incorporating the polymeric material into the compressed fibre material.

When the associated barrier is a coating, preferably this coating is applied by spraying. Accordingly, the present invention further provides a method of making a container which comprises providing a moulded outer shell made from a compressed fibre material with an inner coating by passing a liquid comprising a water soluble or water dispersible polymeric material through a spray nozzle having its outlet mounted to rotate inside the shell such that a coating of the polymeric material is formed on the inner surface of the shell, the coating being resistant to the intended contents of the container.

The spray nozzle may simply rotate, or may rotate and advance longitudinally along the axis of its rotation. This causes the polymeric material emerging from the nozzle to contact the inner surface of the shell along a generally helical path.

The coating may also be applied by dipping the moulded outer shell into a liquid comprising the water soluble or water dispersible polymeric material: such material may also then be incorporated into the shell by absorption. The liquid into which the moulded outer shell is dipped or which is used for spraying is generally an aqueous solution comprising 5 to 50%, e.g. 15–40%, preferably 20–30% of polyvinyl alcohol.

Polymeric material may also be incorporated in the moulded outer shell during its production by including the polymeric material in the fibre slurry which is moulded. The moulded outer shell then preferably comprises 0.2 to 30%, e.g. 0.5% to 20%, preferably 1 to 15%, e.g. 1 to 10%, of the polymeric material. The slurry preferably comprises fillers such as clays, e.g. ball clay and china clay, and starches, which may fill the spaces between the fibres in the fibre outer shell. The fillers may also function as binders to bind the fibres together. The slurry may also comprise a wax material to increase water resistance of the shell.

The coating may also be applied by filling the moulded outer shell with a liquid (such as that used for dipping) and subsequently emptying the shell. A coating on the inside only of the shell is thereby obtained.

It is important that there should be no discontinuity in the barrier provided by the polymeric material of the container, which could give rise to leakage. For this reason the container is typically subjected to a quality control which comprises removing the spray nozzle (if used) from inside the container, reducing or increasing the pressure inside the container and determining whether a reduced or increased pressure is maintained therein. If it is not, this indicates the potential presence of a leak, e.g. in the coating. The container is therefore rejected and reprocessed by having a second coating applied on top of the first one, e.g. by spraying or dipping again and then undergoing the quality control for a second time. This procedure can be repeated as many times as is necessary to achieve a leak-free container.

On an industrial scale, containers which are rejected as having an inadequate coating or barrier are simply removed from the production line, typically by being blown off, and recirculated through the system to have a second coating applied.

The invention will be further described by way of non-limitative example with reference to the accompanying drawings, in which.

Figure 1:
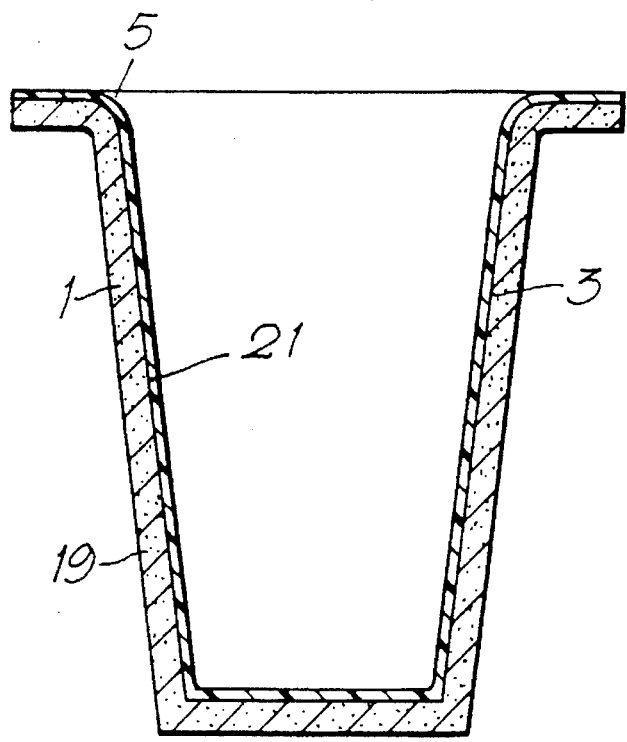
FIG. 1 is a diagrammatic cross-sectional view of an embodiment of the container of the invention.
Figure 2:
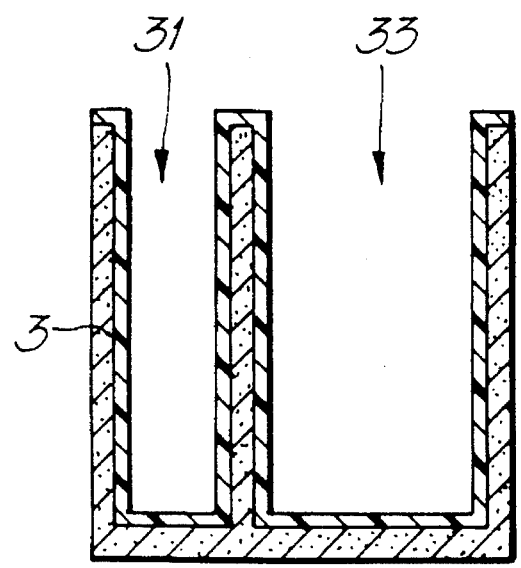
FIG. 2 is a diagrammatic cross-sectional view of a second embodiment of the container of the invention.

As can be seen from FIG. 1 the container comprises an outer shell 1 of approximately cylindrical shape but which flares steadily from a closed bottom towards an open top. It is shown provided with a flange at the open end which forms a rim but it may alternatively have no flange, the edge of the container at the open top being formed by the thickness of the coated shell alone such as is illustrated in FIG. 2. In such cases the edge is optionally a cut edge. This outer is made from a compressed cellulose fibre material made from recycled paper and in the process for its production, which is described below, the inside surface 21 is made to be smooth compared to the outside surface 19 which is rough. This exterior roughness increases the shock-absorbing properties of the outer and also makes for easier handling of the container. The flaring of the container outer allows empty outers to be nested for easy storage and transport.

The moulded outer shell, and in particular the inside surface thereof, is generally configured and adapted to facilitate sliding exit of the contents of the outer container. The envelope, when present, or the container contents are then slidable out of the container by inverting the container.

The moulded outer shell may be cylindrical in cross-section, and may taper towards the base to allow nested stacking of empty containers and also to provide some support against downward movement of the envelope when present. The container may be flared towards the top and preferably lacks any narrowing or neck which might impede exit of the envelope or contents from the outer shell. Such a configuration is particularly useful and necessary for ease of manipulation and to avoid retention of product where it is not desired.

The container is also provided with a coating 3 of a polymeric material which is in direct adherent contact with the outer shell 1. The upper surface 5 of the rim of the outer shell is smoothly curved or flat to allow a lid (not shown), which is a metal foil and plastics laminate, to be sealed to it after filling of the container. The coating may comprise any suitable polymeric material and, as later described, is preferably applied by spraying. The polymeric material is chosen to be impermeable and resistant to the liquid to be stored in the container. A typical material is polyvinyl alcohol, but other sprayable water soluble or water dispersible polymers may also be employed.

The outer shell 1 is made from recycled cellulose fibre obtained from waste paper by mulching the paper with water, aluminium sulphate (as a pH adjuster) and rosin by drawing it through a coarse mesh. The rosin helps bind the fibres together and increases the rigidity and water resistance of the final product. A deflacker may be used to assist fibre break-up. The slurry so produced is drained on a belt and applied to a fine wire-mesh mould against which it is compressed to expel the liquid. In this embodiment the mould is formed into the shape of the inside of the container outer shell 1 which results in a relatively smooth inside impressed with the pattern of the mesh used. The outside is left somewhat rougher. The amount of compaction applied in the moulding process and also the fineness of the mesh used to chop the paper into fibres affect the density of the product and thus its rigidity and shock absorption properties. A denser material can be used to increase strength but this reduces the effectiveness of the shock absorption and the final result is a selected compromise between the two to give the required result for the particular application.

The outer shell 1 may also comprise polymeric material, e.g. polyvinyl alcohol, which may be included in the slurry which is moulded to form the outer shell.

The container may also comprise a water soluble or dispersible envelope for the contents and which is filled, sealed and simply placed in the container before sealing by the lid. The coating 3 provides the container with a smooth inner surface and this prevents the envelope from being punctured. In use the lid (not shown) can be removed and the envelope easily tipped out, e.g. into a tank of water diluent for use. The container is particularly suitable for hazardous concentrates of, for example, agrochemicals, because the chances of the user coming into contact with the concentrate are reduced. The sealed envelope is simply tipped into the water whereupon it disappears leaving the concentrate to mix with the diluent.

The container is made in a number of sizes, e.g. 1 liter, 2 liters and 3 liters which are chosen to be "unit-quantity" sizes i.e. quantities such that the entire contents are used at one go. This avoids the user retaining half-full containers which can constitute a hazard.

In a further embodiment shown in FIG. 2 the container is constructed to have several compartments, e.g. 31 and 33, the inner walls of which are each provided with a closely adherent coating. The container, not provided with a flange at the open end in this embodiment, is sealed over the top with a lid (not shown), so that multi-component products can be stored, one component to each compartment. The compartments may be sized to contain the appropriate proportions of the components.

The multi-compartment container may also be constructed with walls of compressed fibre material which comprise a water soluble or water dispersible polymeric material such as polyvinyl alcohol in which case the closely adherent coating may be included for additional security, if it is needed, or omitted.

Figure 3:
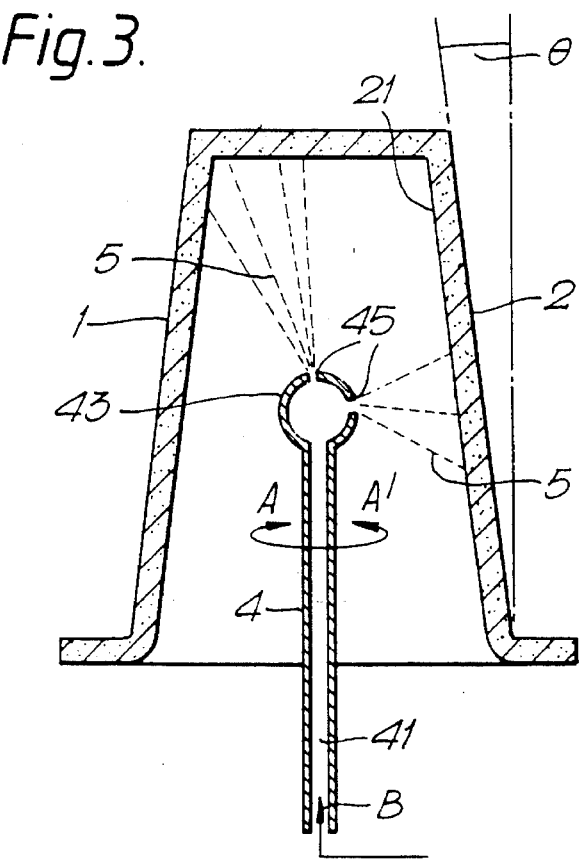
FIG. 3 is a diagrammatic cross-sectional view of an embodiment of a first aspect of the method of the invention.

FIG. 3 shows one embodiment of the method of the invention, wherein the outer shell 1 of the container is rendered waterproof by the spraying of a polymeric coating on to its inner surface 21. The outer shell 1 is mounted upside down with a spray nozzle 4 inserted into it. The nozzle as a whole comprises a feed tube 41, through which a polymeric material is fed in the direction of arrow B, and a spray head 43 incorporating one or more outlets 45 (two are shown in this embodiment).

The nozzle is mounted to rotate in either sense, indicated by arrows A, A', which enables the sprays 5 of polymeric material emerging from the outlets 45 to sweep the inside of the container and cause an even polymeric coating to be deposited on the inner surface 21, where it dries out.

The nozzle may alternatively combine rotation with movement in a longitudinal direction, such that material sprayed from its nozzle outlets away from the longitudinal axis contacts the inner surface of the container along a generally helical path. This facilitates an even coating of the container inner surface.

In order to optimise the effectiveness of the spraying process it is preferred that the angle that the outwardly sloping wall 2 of the container makes with the vertical, which angle is denoted e, be at least 1.5°.

Figure 4:
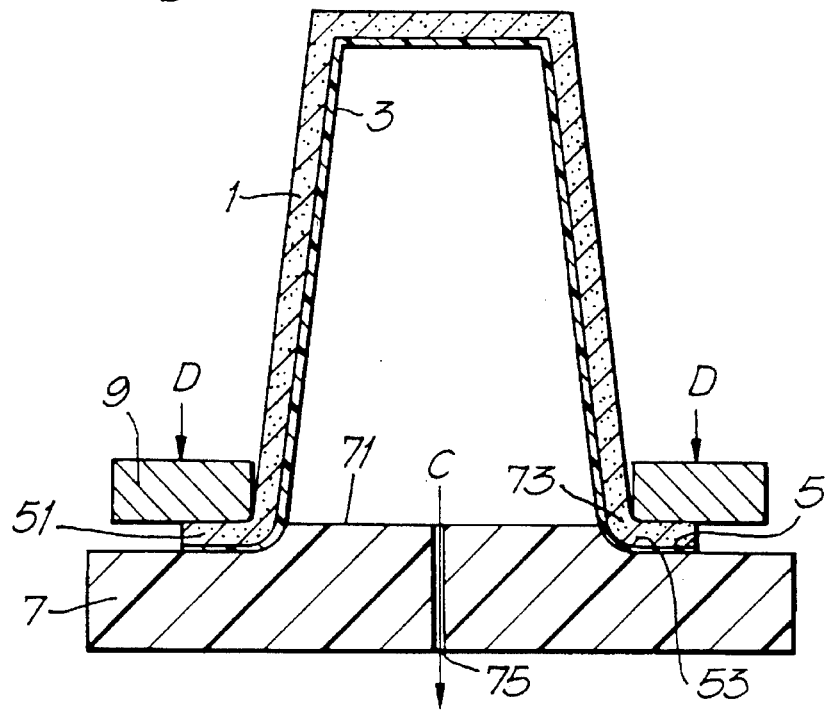
FIG. 4 is a diagrammatic cross-sectional view of an embodiment of a Second aspect of the method of the invention.

FIG. 4 represents an embodiment of the method for testing the inner coating for leaks. The container 1, incorporating an inner coating 3 is inverted on a block 7 having a surface 71 which is adapted to receive the open end of the container such that a substantially airtight seal between the two can be formed. The surface 71 is furthermore smooth to ensure that the coating 3 is not scratched or punctured when the container is in place. The block surface has shoulders 73 which conform to the curve 53 of the container opening and the rim 51.

The seal between block and container is augmented by the application of pressure to the container rim 51, as indicated by arrows D, via an annular device 9 which is slipped over the container once it is positioned on the block 7. The block may be made of any suitable material but is typically a plastics material such as polytetrafluoroethylene (PTFE).

There is a narrow opening 75 in the block 7 through which air is sucked, as indicated by arrow C, to lower the pressure inside the container. The container is maintained in this condition for a fixed period and the pressure across the container is then measured. From the value obtained it can be determined whether or not there is likely to be a leak in the coating.

This method of testing may also be applied to containers in which polymeric material has been applied by dipping or by incorporating polymeric material into the container wall.

We claim:

1. A container comprising a moulded outer shell made from a compressed fibre material the material comprising a water soluble or water dispersible polymeric material to render the shell resistant to a hazardous chemical product when contained therein and/or the shell having at least an inner surface thereof provided with a closely adherent coating comprising a water soluble or water dispersible polymeric material which is resistant and impermeable to a hazardous chemical product when contained therein.

2. A container according to claim 1 in which the contents comprise an agrochemical.

3. A container according to claim 2 in which the contents comprise a pesticide.

4. A container according to any one of claims 1, 2 or 3 in which the contents are a solid, liquid or gel.

5. A container according to any one of claims 1, 2 or 3 which the contents are a liquid or gel.

6. A container according to any of claims 1, 2 or 3 wherein the inner surface of the moulded outer shell is provided with a closely adherent coating comprising the water soluble or water dispersible polymeric material.

7. A container according to claim 6 wherein the coating has been sprayed in situ.

8. A container according to any one of claims 1, 2, 3, wherein the polymeric material comprises polyvinyl alcohol.

9. A container according to any one of claims 1, 2 or 3, wherein the compressed fibre material is bio-degradable.

10. A container according to any of claims 1, 2 or 3, wherein the compressed fibre material is compostable.

11. A container according to any one of claims 1, 2 or 3, wherein the compressed fibre material is recycled cellulose fibre.

12. A container according to any one of claims 1, 2 or 3, further comprising a water soluble or water dispersible envelope for containing the contents wherein the envelope is slidable out of the container by inverting the container.

13. A container according to any one of claims 1, 2 or 3, wherein the moulded outer shell is divided into a plurality of compartments by at least one wall made from said compressed fibre material, and having an associated barrier comprising a water soluble or water dispersible polymeric material.

14. A container as claimed in claim 1 containing an agro-chemical fertilizer or biocide.

15. A method of making a container which comprises providing a moulded outer shell made from a compressed fibre material with an inner coating by passing a liquid comprising a water soluble or water dispersible polymeric material through a spray nozzle having its outlet mounted to rotate inside the shell such that a coating of the polymeric material is formed on the inner surface of the shell, the coating being resistant to a hazardous chemical product when contained in the container.

16. A method according to claim 15 wherein the outlet of the spray nozzle is directed to spray the polymeric material outwardly away from an axis about which the nozzle rotates during axial advance during spraying.

17. A method of making a container which comprises providing a moulded outer shell made from a compressed fibre material which fibre material may comprise a water soluble or water dispersible polymeric material to render the shell resistant to a hazardous chemical product when contained in the container and dipping the shell into a liquid comprising the polymeric material or spraying the inner surface of the shell according to any one of claims 15 or 16, to provide at least the inner surface of the shell with a closely adherent coating comprising a water soluble or water dispersible polymeric material which is resistant to a hazardous chemical product when contained in the container.

18. A method according to any one of claims 15 or 16 wherein the applied coating is subsequently tested for the presence of a leak, which comprises removing the nozzle, if present, from inside the container, reducing or increasing the pressure inside the container and determining whether a reduced or increased pressure is maintained therein.

19. A method according to claim 15 which comprises reprocessing the container if a leak is indicated.

* * * * *

UNITED STATES PATENT AND TRADEMARK OFFICE
CERTIFICATE OF CORRECTION

PATENT NO. : 5,516,562
DATED : May 14, 1996
INVENTOR(S) : Edwards et al.

It is certified that error appears in the above-indentified patent and that said Letters Patent is hereby corrected as shown below:

Claim 1, column 6, line 56, after "resistant" insert --and impermeable--.

Signed and Sealed this

Sixth Day of August, 1996

Attest:

BRUCE LEHMAN

*Attesting Officer*      *Commissioner of Patents and Trademarks*